United States Patent [19]

Caine

[11] Patent Number: 4,600,913
[45] Date of Patent: Jul. 15, 1986

[54] COLLISION AVOIDANCE DEVICE
[76] Inventor: Harold A. Caine, 484 Kent Ct., Oceanside, N.Y. 11572
[21] Appl. No.: 685,338
[22] Filed: Dec. 24, 1984
[51] Int. Cl.⁴ .............................................. B60Q 1/26
[52] U.S. Cl. ..................................... 340/104; 340/66; 340/94; 340/97
[58] Field of Search .................. 340/66, 67, 74, 81 R, 340/83, 104, 97, 94, 84, 87

[56] References Cited

U.S. PATENT DOCUMENTS

| | | | |
|---|---|---|---|
| 2,330,561 | 9/1943 | Dietrich | 340/113 |
| 3,501,742 | 3/1970 | Ellison | 340/66 |
| 3,518,624 | 6/1970 | Smith | 340/87 |
| 3,711,828 | 1/1973 | Hawkins | 340/97 X |
| 3,787,808 | 1/1974 | Knopf | 340/74 |
| 3,868,629 | 2/1975 | Caine | 340/104 |

Primary Examiner—James L. Rowland
Assistant Examiner—Jeffery A. Hofsass

[57] ABSTRACT

A collision avoidance device for providing integrated and more standardized visual indications and methods as a system of the degree of safety space cushion following distance conditions between leading and following vehicles. The device is mounted on a central housing placed on the rear of a leading vehicle at approximately center eye level for viewing by the drivers of the following vehicles. A safe distance light is included in the housing as well as a brake light. The safe distance signal light includes a plurality of illuminated areas with opaque spaces therebetween. The opaque spaces are of sequentially increasing width or thickness. The opaque spaces will progressively disappear to the view of the driver of the following vehicles with greater distance from the leading vehicle. Additional safety lights can be included such as a green safety light as well as directional signals. The green light can be used to indicate acceleration, or may be used to indicate that the set belts are fastened. The lights in the device can be formed to blink with emergency stopping. The integration of all of the various safety illuminated factors provides a basic method of visual stimulation and an increase in the driver's earlier visual perception and mental awareness of the safety conditions so as to improve the resultant earlier reaction time for stopping as well as based upon an awareness of proper safe spacing between the vehicles indicating visual cues as perceived by the drivers of the following vehicles.

24 Claims, 13 Drawing Figures

COLLISION AVOIDANCE DEVICE

BACKGROUND OF THE INVENTION

This invention relates to vehicle safety devices, and more particularly to a collision avoidance device which can be mounted as a single unitary housing at approximately eye level on the rear of a leading vehicle so as to provide to the driver of a trailing vehicle an earlier visual indication and recognition of the safety "space cushion" distance between the vehicles.

A major cause of vehicle accidents today involves front-to-rear collisions. Leaving insufficient room between vehicles is the cause of one of the most costly and involved types of traffic accidents, the rear end collision. Rough estimates conservatively indicate that it accounts for more than one-third of all traffic mishaps, and one-half of the resulting injuries. In New York State it accounts for 40% of all vehicle accidents. Driving too close to a leading vehicle is the most basic driving error. Tailgating produces the deadliest damage, ranking as the number one cause of auto accidents and injuries on the highway.

Not only do such accidents result in loss of life and injuries which produces human suffering to persons and their families, but such accidents also produce a great cost in automobile repairs. Such rising repair costs and claim settlements are reflected into the increased fees that the insurance buying public must pay.

Nevertheless, rear end collisions are probably the easiest accidents to prevent. Generally, such collisions are the direct result of drivers trailing so closely that they cannot stop in time. When the forward vehicle provides a sudden stop, or even on occasion a gradual stop, the driver of the trailing vehicle fails to appreciate that stopping of his car involves a considerable number of factors.

In stopping a car, care must be paid to the reflexes of the individual driver. This, of course, varies with the type of driver, his age, his visual acuity, as well as the attention and alertness he is paying to the particular situation. It also depends upon other factors including the car speed, the road surface and slope, weather, tires, brakes, and even car weight. It varies between day time and night time driving, the amount of ambient light available, and numerous other factors, many of which may not even be considered by the average driver.

Because of the numerous factors involved it is almost impossible to specify an exact amount of distance required between cars at all times. Nevertheless, various safety organizations have provided recommendations based upon various average factors. For example, one safety organization recommends one car length for each 10 miles per hour of speed of the trailing vehicle. Another safety organization suggests a two second rule applied by selecting a fixed object on the road and counting for a time period of two seconds beginning as a leading vehicle passes the fixed object to indicate that you have approximately two seconds before the trailing vehicle reaches that object. Other organizations have provided yet further, and frequently more complex suggested measuring systems.

The basic problem with all of the suggestions is that it requires detraction of the driver from the actual driving situation. The driver must spend so much of his awareness in determining the distance between his vehicle and the leading vehicle, that he may fail to devote his complete attention to the actual driving situation and may be distracted from an emergency stopping condition. It would therefore be superior to provide an indication of the safe trailing distance by focusing the attention of the driver of the trailing vehicle onto a visually centralized location on the leading vehicle. By providing at this central location the information concerning proper spacing distance required you can thereby avoid any distraction of the driver of the trailing vehicle from focusing on the driving scene and the leading vehicle.

One device which provides such visual indication of suitable distance between the vehicles is described in U.S. Pat. No. 3,868,629, entitled "Visual Collision Avoidance Warning Device," issued Feb. 25, 1975 to the inventor of the present application. In this invention, there is provided a warning device on the back of a leading vehicle which includes a plurality of pairs of adjacent lights. The size of both of the lights of a single pair are identical. However each pair of lights increases in size from the previous pairs. The lights of a particular pair are associated with a particular speed. At a suitable distance between the vehicles, the lights of a pair will merge. Accordingly, by focusing onto a particular pair of lights corresponding to a particular average speed, the driver of a trailing vehicle can determine if he has adequate distance behind the leading vehicle. If he sees that pair of lights as two separate and distinct lights, he is too close. On the other hand, if the lights have merged, then he has adequate spacing for the speed.

In U.S. Pat. No. 3,950,098 issued Apr. 13, 1976 to the inventor of the present application, entitled "Safe Distance Visual Warning Device", there is provided another distance warning device. In that patent, there is provided a series of geometric areas of progressively increasing size. Each area is assigned to a specific speed. At the particular speed, if that particular geometric area can be distinctly seen, then the distance is inadequate for the speed. For adequate distances at that speed, that particular geometric area will merge with previous geometric areas assigned to lower speed.

While the aforementioned devices can improve the awareness of the driver of the trailing vehicle, further improvement in stimulating the driver's visual perception and mental awareness can bring about even further improved results. For example, providing an improvement of awareness or reaction time of even 1/10th of a second not previously available gives an additional three feet of stopping distance at 20 miles per hour, six feet at 40 miles per hour, and as much as nine feet at 60 miles per hour. These extra feet can be the difference between a safe stop and a rear end collision. Accordingly, even 10ths of seconds of improvement in awareness or reaction time is of considerable significance. It should be noted that these computations are made in connection with vehicles in motion.

More recently, there has been considerable private and governmental testing of a single high mount brake light to be provided centrally on the rear of a leading vehicle. This is now becoming mandatory on all new vehicles. Through various tests, it has been found that such central high mounted brake light provides greater and improved recognition factors to the driver of the trailing vehicle and improves his earlier reaction time by about 1/10th of a second to an emergency condition where the brake light has been applied by the leading vehicle.

It is therefore of considerable importance, to integrate various of the visual cues as safety measures provided on the rear of a leading vehicle in order to minimize and/or to avoid rear end collisions. These include the use of the high mount single brake light centered at eye level, as well as the use of the safe distance single light on the rear of a vehicle to provide indications of safer "space cushion" stopping distance. The use of the safe distance signal light also provides environmental cues to the driver to signal the behavior that is needed and thereby help modify the human behavior with regard to tail-gating as well as other driving situations.

SUMMARY OF THE PRESENT INVENTION

The present invention has found that by combining various of the safety warning devices into a single unitary housing and placing it at approximately center and at eye level on the rear of a leading vehicle, there is provided an improvement in the earlier visual perception and mental awareness of the driver of a trailing vehicle. In fact, it may actually stimulate and increase the driver's visual perception and mental awareness so that there is improved perception time to each stopping situation which results in an improvement of the stopping time.

More specifically, it has been found that by incorporating various ones of the safety light concepts utilized in connection with collision avoidance and by incorporating them into a single unitary housing placed at approximately center eye level, there is provided to the driver of the trailing vehicle a total Gestalt, or more complete phenomenon effect, of the safety situation with respect to his vehicle and the leading vehicle. This focusing of attention and awareness of the driver of the trailing vehicle to a single unitary warning device on the leading vehicle, thereby improves his attention and recognition of the particular hazardous situation and thereby reduces the reaction time in an emergency situation.

Although each of the individual warning devices may provide earlier perception and reaction time individually, integrating the various devices into a single common housing, and placing the single housing at approximately center eye level gives a synergistic effect whereby the total reduction in reaction time is greater than the sum of the individual reductions provided by each safety device individually.

More particularly, applicant has found that it is of particular benefit to incorporate into a single housing unit the brake light with a safe distance indicating light. This single integrated housing unit is placed at approximately center eye level at the rear of the forward vehicle to provide an improved visual cue of the safety conditions to the driver of the trailing vehicle.

The brake light works as a standard brake light whereby the light turns red upon application of brake pressure. The distance warning light includes a plurality of constantly illuminated areas separated by various shaped opaque, non-illuminated areas. The number of the illuminated areas that are viewed is an indication of the distance and time required to stop.

The safe distance signal light is constantly illuminated while the brake light is illuminated whenever the brake is applied. The combination of utilizing both the safe distance signal light and the central eye level brake light brings about the synergistic result. When the red brake light appears a problem is indicated, while the continuity of the safe distance signal light becomes a working recognition tool. In this manner the driver of the trailing vehicle is able to utilize a choice of accident prevention decision factors not previously available.

In addition to providing a combination safe distance signal light and central eye level brake light, the safe distance signal light of the present invention differs from that of the previous two mentioned patents. Each of the two aforementioned issued patents presented the concept that it was the size of the illuminated area or viewed area which was of importance. Accordingly, in the first of the two issued patents, there was described pairs of illuminated areas. Each of the pairs increased in size from the previous pairs with the size relating to the distance between the vehicles. In the second of the two issued patents, the geometric areas viewed again differ in size in accordance with the specific speed. However, it has now been found that of more significance than the size of the illuminated or viewed area, is the spacing between the illuminated or viewed areas. Accordingly, it is even possible to utilize illuminated areas of identical geometric size. However, the opaque spacing between those geometric areas can be varied so as to provide the indications of and for appropriate safe space-cushion distance driving.

Furthermore, rather than provide a series of specified illuminated areas with each of those illuminated areas associated with a particular speed, the present device provides for a plurality of illuminated areas which are set for an average set of variables. By setting the opaque spacing based upon an average speed, visual acuity, car and road condition, etc. appropriate sized opaque spaces can be provided between the illuminated areas so that the elimination or disappearance of the opaque spaces can provide an indication of adequate time for stopping. The present invention has found that opaque space between the illuminated areas should be of increasing larger width or thickness. Accordingly, for the shortest time, such as 2 seconds, two adjacent illuminated areas are separated by an opaque spacing of a first thickness. For a greater amount of time such as three seconds, the illuminated areas are separated by an opaque space of greater width or thickness. Finally for the larger time of 4 seconds, the largest opaque space separates the illuminated areas.

The key factor is that the opaque spaces separating the illuminated areas are of increasing width or thickness. However, the particular shape of the opaque areas can be varied. The opaque areas can be bars, an X, they can be combined to form a +, an H, or other shapes.

By way of example, four illuminated areas can be provided. If the individual sees all four illuminated areas, he can assume he is too close and is in a high hazard following situation which gives him under 2 seconds to stop. Two of the illuminated areas can be separated by a narrow opaque space. As the distance between the vehicles is increased, this narrow opaque space will disappear and the driver of the trailing vehicle will see three illuminated areas indicating the need for at least 2 seconds to stop. The next opaque space separating the previous illuminated areas with the next illuminated area is of larger width or thickness. Increasing the distance between the vehicles causes this opaque space to disappear. This indicates about 3 seconds to stop. The largest opaque space separates the previous illuminated areas with the last illuminated area. Adequate distance between the vehicles causes this space to disappear and only one overall illuminated area will be viewed by the driver of the trailing vehicle.

By further incorporating additional safety warning devices on the same unitary housing unit, additional reduction in earlier awareness and reaction can be achieved. For example, there can be included a green light to provide an indication of the leading driver's use and non use of the accelerator pedal. This light when not illuminated indicates that the vehicle is not being accelerated. All these lights integrated on a common unit even further improves the Gestalt in the driver's mind so as to provide yet a further composite picture of the safety condition between his vehicle and the forward vehicle. By further providing left and right indicator signal lights on the same housing unit, you can further improve the earlier awareness for reaction time by further adding to the driver's total mental awareness of his safety condition and further stimulating the visual perception and mental awareness of the driver of the trailing vehicle. In doing this a one size target is provided on which the driver can focus.

Accordingly, it is an object of the present invention to provide a collision avoidance device which improves upon the safety devices heretofore provided in the prior art.

Another object of the present invention is to provide a collision avoidance device which standardizes and integrates a number of safety lights on a common unitary housing so as to provide a greater mental awareness of the safety, caution or danger condition, to the driver of a trailing vehicle.

Yet another object of the present invention is to provide a collision avoidance device which is mounted at approximately center eye level on the back of a leading vehicle and integrates and standardizes a number of safety lights for visual perception to the driver of the trailing vehicle.

Yet a further object of the present invention is to provide a collision avoidance device which incorporates a brake light with a safe distance warning light into a single unitary housing so as to provide a synergistic effect therebetween in reducing the mental awareness and perception time as well as to affect the earlier reaction time of the driver of the trailing vehicle.

Briefly, in accordance with the present invention, there is provided a collision avoidance device for producing an integrated visual indication of safer space-cushion following distances between a leading and a trailing vehicle. The device includes a unitary housing for central mounting on the rear of the leading vehicle at approximately center eye level for viewing by the driver of the trailing vehicle. In this housing there is included a brake light. There is also provided a safe distance signal light which is spaced sufficiently from the brake light to avoid diffusion therebetween. The safe distance signal light includes a number of illuminated geometric areas. Opaque spaces of sequentially increasing size are positioned between the adjacent ones of the illuminated areas. In this manner, the opaque spaces will progressively disappear to the view of the driver of the trailing vehicle with greater distance between the vehicles.

In an embodiment of the present invention, the safe distance signal light includes four illuminated areas located in four quadrants of a rectangular grid system. The vertical and horizontal axes separating these four quadrants provide the opaque spaces and have their respective widths of increasingly larger size so that as the distance between the leading and trailing vehicle increases, the various sized opaque spaces will progressively disappear from view of the driver of the trailing vehicle. In this way, when the driver is close to the leading vehicle, he will view all four lights. As he increases the trailing distance he will begin seeing only three lights, then two lights and ultimately when he is far enough back, he will see only one light.

In other embodiments the safe distance signal light includes an "X" formed of an opaque area of smallest thickness. Spaced therefrom is another opaque bar of a larger thickness, and finally another opaque bar of largest thickness.

A further embodiment of the safe distance signal light can include three spaced apart vertical opaque bars of progressively increasing thickness.

Another form of the safe distance signal light can include an opaque area in the form of an "H" with the horizontal bar being the thinnest, and the two vertical bars being progressively thicker.

The device can include an illumination bulb which maintains a constant illumination on the face of the device. By including a light sensitive detector, the amount of constant illumination can be varied between a daytime illumination and a nighttime illumination.

The safe distance signal light would require standardization of use. Drivers would then be trained in proper understanding and appreciation of the system and how it is used. Once trained, they would be easily able to recognize the opaque symbols and interpret their safe distance meaning.

The aforementioned objects, features and advantages of the present invention will, in part be pointed out with particularity and will, in part, become obvious from the following more detailed description of the invention, taken in conjunction with the accompanying drawings, which form an integral part thereof.

BRIEF DESCRIPTION OF THE DRAWINGS

In the drawings:

FIGS. 10A thru D, 11A thru D, 12A thru D, and 13A thru D, respectively show four embodiments of the safe distance signal light of the present invention and for each embodiment the visual perception of the light for different distances between the vehicles.

DESCRIPTION OF THE PREFERRED EMBODIMENT

Figures 1, 2:
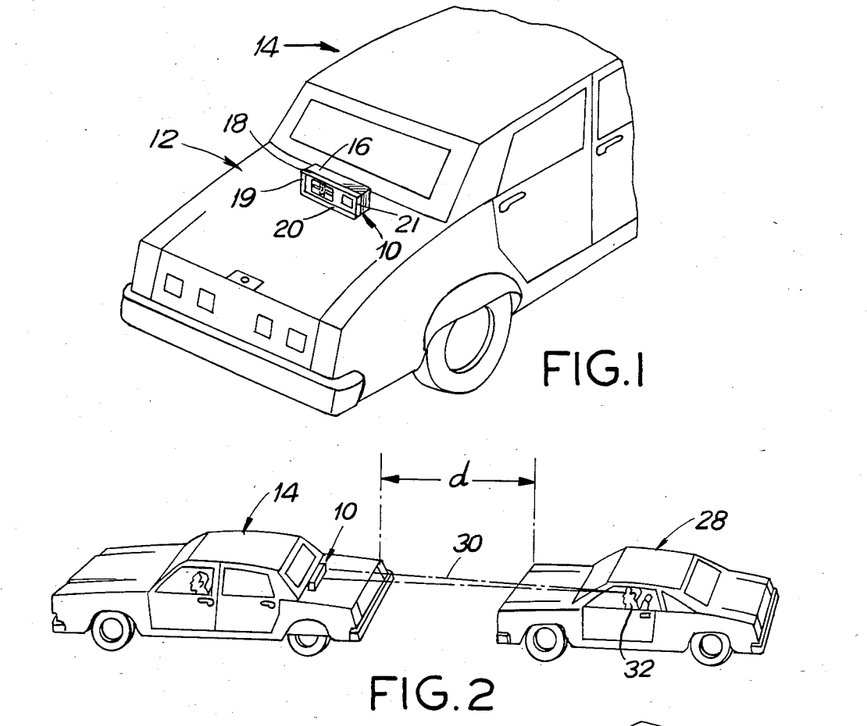
FIG. 1 is a perspective view of one embodiment of the present invention installed on the trunk lid of a vehicle.
FIG. 2 is a perspective view schematically showing the forward vehicle employing the device of the present invention for view by the driver of a trailing vehicle.

Referring now to FIG. 1 the collision avoidance device of the present invention is shown generally at 10 and is shown to be mounted on the top of the trunk lid 12 of a vehicle 14 which would serve as a leading vehicle. The device is shown to be centrally mounted on the vehicle trunk lid and is situated approximately center eye level. The device includes a substantially rectangular housing 16 including a four sided extending lip 18 projecting rearwardly so as to form an overhang shade preventing the glare from the sunlight. There is also provided a deeper bottom ledge 20 serving as a base wall to prevent the glare from bouncing off the trunk lid and avoiding suitable perception of the various lights on the device. Side shade walls 19 and 21 are also provided. The device has appropriate mounting means so as to suitably affix the device onto the trunk lid. On those vehicles not having trunk lids such as vans, station wagons, trucks, commercial vehicles, hatch backs, and others, the device will be mounted at an approximate location at center eye level.

Figure 3:
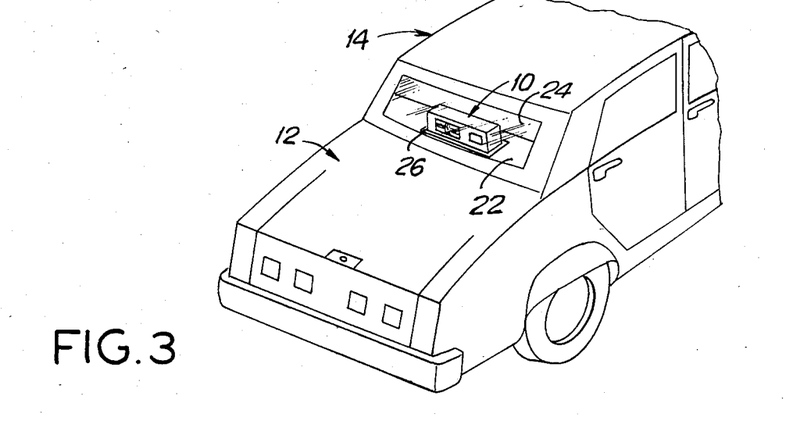
FIG. 3 is a schematic view showing the device of the present invention installed on the vehicle for viewing through the rear window.

As shown in FIG. 3, an alternate embodiment shows a similar device 10 mounted on the shelf 22 behind the rear window 24 of the vehicle 14. Again, the device is centrally mounted and is at approximately eye level. A suitable mounting base 26 is provided to facilitate mounting of the housing unit onto the shelf 22. The device could also be hung down, or could stand up in front of the rear window and/or attached to the rear window.

As shown in FIG. 2, the device is used by having it positioned on the rear of the leading vehicle 14. A suitable trailing vehicle 28 is shown spaced from the forward vehicle by a distance "d". As shown by the dotted lines 30, the driver 32 of the trailing vehicle 28 can view the collision avoidance device 10 which is eye mounted centrally on the forward vehicle 14. By viewing the device 10, the driver 32 obtains a complete integrated visual indication of the safety conditions between his vehicle and the leading vehicle.

More specifically, the housing unit 10 incorporates a number of safety warning lights. By incorporating these into a single unitary housing unit, which is centrally mounted at approximately eye level, serves as a focal point for the driver of the trailing vehicle so that he can concentrate his safety awareness onto a single unit. In doing so, it heightens his awareness of the safety condition. Furthermore, it does not distract the driver to irrelevant objects at the side of the road, or other identifying objects unrelated to the forward vehicle. In fact, not only does it improve high mental awareness, but by housing all of the safety units into a single unitary housing, it actually stimulates and increases the driver's visual perception and mental awareness of the safety situation on a standardized and universal basis which can also be used internationally.

Figure 4:
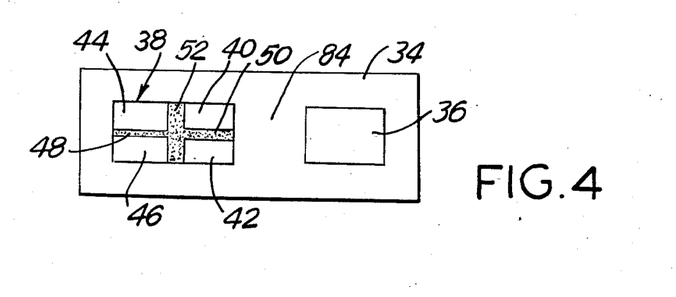
FIG. 4 is a schematic view of the front face of a collision avoidance device of the present invention in accordance with one embodiment thereof.
Figure 5:
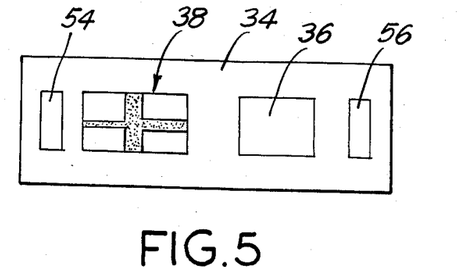
FIG. 5 is a view similar to that shown in FIG. 4 showing a further variation.
Figure 6:
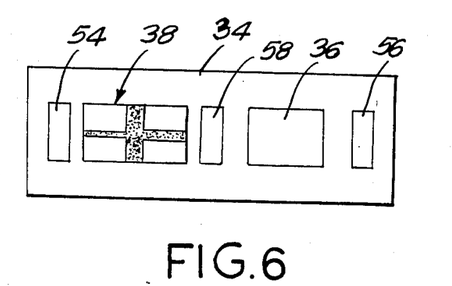
FIG. 6 is a view similar to that shown in FIGS. 4 and 5 and showing a further variation.

As shown in FIG. 4–6, the housing unit itself includes a front face 34 from which the illuminated areas are viewed. Through the front face there is provided a standard brake light 36, and a safe distance signal light, shown generally at 38.

The safe distance signal light 38 includes four illuminated area each positioned at the four quadrant sections of the rectangular area. Specifically, the upper right section 40 has beneath it a section 42. On the left at the upper corner there is provided the illuminated area 44, beneath it there is provided the illuminated area 46. Each of these areas 40–46 can be either of equal size, or can vary in size. However, what is of significance is that the separating opaque spaces between the illuminated area are of different widths or thicknesses.

As shown, the non-illuminated opaque space on the left side which is between the illuminated areas 44 and 46 is designated as area 48 and is shown to be of a first and smallest width or thickness. On the right side horizontally separating the illuminated areas 40 and 42 is an opaque area 50 which is shown to be of a second thickness slightly greater than the thickness of the area 48. The vertical bar 52 which separates the right hand illuminated areas 40 and 42 from the left hand areas 44 and 46, is shown to be of a thickness that is even larger than the thickness 50.

It is specifically the fact that the widths or thickness of the separating opaque areas vary in increasing size that provides the awareness of distance to the driver of the trailing vehicle. The distances between the leading and trailing vehicle will cause the disappearance and reappearance of one or more of these opaque separating spaces between the illuminated areas.

Specifically, when the driver of the trailing vehicle is very close to the leading vehicle, the driver will see all four illuminated areas 40, 42, 44, 46. As the driver of the trailing vehicle increases his space behind the forward vehicle, the narrowest opaque separating space 48 will disappear from view of the driver of the trailing vehicle. This will cause the illuminated areas 40 and 42 to merge and appear as one light. As a result, the driver will only see the three illuminated areas, namely the merged illuminated areas 40 and 42 as a single illuminated area, and the additional illuminated areas 44 and 46.

As he continues to drop behind the forward vehicle, the next widest opaque space 50 on the right side will disappear from the view of the driver. This will cause the illuminated areas 44 and 46 to merge. As a result, there will be only two illuminated areas seen, namely the right hand side comprising the merged illuminated areas 40 and 42, and the left hand side comprising the merged illuminated areas 44 and 46. The center darkened opaque space 52 will still be in view separating the lights into two sections.

As the driver continues to further fall behind the forward vehicle, the center opaque dividing space 52 will also disappear from the view of the driver. This will cause all four illuminated areas to merge into one common illuminated area.

By means of the disappearance of the various separating spaces, the driver of the trailing vehicle can adequately judge minimum or maximum proper distances for various speeds such as 20 mph, 40 mph and 55–60 mph or an average speed for heavy, light and open traffic. Specifically, when he sees all four spaces he knows he is trailing too closely. As he continues to fall back, he can get an idea of proper spacing so that when he finally sees only one illuminated area, he knows he is at a safer distance for the speed at which he is traveling.

Each of the illuminated areas can be assigned at a specific speed. In this manner, if the smallest opaque space 48 is assigned to a specific speed, say for example 20 miles per hour, then the driver of the trailing vehicle going at 20 miles per hour can only focus on the specific space 48. If he sees that space as a specific unique separating space, he knows he is too close. If he fails to find that space, he knows he is at an adequate distance.

The thinnest opaque space 48 can be placed on the left so the driver views the device from left to right similar to the way he has been trained for reading. This can be reversed so that the thinnest opaque area is placed on the right whereby the symbols indicate, in sequence, open traffic, light traffic, heavy traffic, and then the stop light.

However, the entire four areas can be utilized based upon averages. Specifically, by assuming an average speed, an average road condition, an average visual acuity of 20/30, an average driver age, an average type of car, etc. and assuming an average speed of about 55 miles per hour, the device can be preset with specified opaque spacings between the illuminated areas. These opaque spacings would have a sequence of widths or thicknesses corresponding to proper distances based upon the speeds of 20 miles per hour for the smallest width, 40 miles per hour for the next width and about 55-60 miles per hour for the largest opaque width, which gives about two or three or four seconds stopping time respectively for each of these speeds.

For example, assuming all of the above averages as indicated, the spacings can be set so that if the driver sees all four illuminated areas, the driver knows that he is in a high hazard situation and cannot stop in time under two seconds. When he sees three areas, he knows he has two seconds to stop. When he sees two illuminated areas, he knows he has three seconds to stop and when he sees only one illuminated area he knows he has four seconds to stop.

By including both the brake light 36 and the safe distance light 38 in a common housing unit, the driver can achieve an awareness of both stopping and safe spacing in a single unit. This gives the driver a Gestalt or complete picture of safety in a single unit. He will therefore focus on this unit and have an earlier perception and reaction time to both stopping as well as to proper safe spacing. The safe distance signal light 38 in itself provides an improved result, and the single unitary high mounted brake light by itself also provides an improved result. By integrating the two devices in a common housing, there is provided a synergistic result whereby the total effect is greater than the individual effect and improvement provided by each of these devices individually. Such synergistic effect may be in only matters of 10ths of seconds. However, it must be remembered that each 10th of a second provides a number of feet, as heretofore mentioned which may be the difference between adequate time and space for stopping and thereby avoiding a rear end collision. This composite therefore brings about an improved perception and recognition which results in split second earlier reaction time.

When the brake light becomes illuminated a problem has been identified. However, with the use of the safe distance signal light designed to anticipate problems, the driver of the trailing vehicle can now have alternatives. He can have the choice of following further back, or he can pass the lead vehicle, or he can change lanes. All these avoid a hard stop, which in turn omits a complexity reaction by the driver of the trailing vehicle. It also avoids the possibility of chain reaction front to rear collisions of two or more vehicles who are trailing too closely behind each other. Each car in turn cumulatively loses additional perception time and additional reaction time from all the previous cars, which is the reason for so many chain collisions.

It should also be appreciated that the driver of the trailing vehicle can see the device not only on the immediate car in front of him but also on two cars in front of him as well as on the cars in front of him in other lanes, depending upon the height and construction of the various vehicles involved.

As shown in FIG. 5, in addition to the brake light 36 and the safe distance signal light 38, it is possible to also include in the same face 34 the left and right signal lights 54, 56. This again helps to standardize driving principles involved and concentrates the driver's further attention and awareness to the single unit which again improves the total visual perception stimulated in the mind of the driver.

As shown in FIGS. 5 & 6 it is possible to further include an additional area, such as the green accelerator warning areas 58. Utilizing the warning area 58, as the vehicle accelerates, the green light is on. When the driver stops accelerating, the green light goes off. Accordingly, when the driver in the forward vehicle depresses the brake, the brake light 36 will illuminate, in red, as usual. However, when the driver takes his foot off the accelerator, even though he does not put his foot on the brake, the green light 58 will go off providing an earlier warning to the driver of the trailing vehicle that the forward vehicle is no longer accelerating. In addition, the green light can actually be connected to the seat belts so that the driver not fastening his seat belts, the green light won't go on. This would be a good way for law enforcement personnel to check if the seat belts are fastened. The checking could be done outside the vehicle by looking if the green light goes on or not. The acceleration light would not function if the seat belt was not properly locked in position.

Accordingly, it is seen that by integrating a number of safety devices into a single unit, the synergistic effect of all of these units is further enhanced. In fact, other safety features can be included. For example, the lighting in the unit 38 can be illuminated for both day and night and can be made to blink at a constant rate when there is sudden emergency stopping. Therefore, when there is a normal braking the brake lights will go on. When there is emergencly hard stopping with heavy pressure applied to the brake, then the lights 38 can blink on and off at a constant rate. This will provide further improved and earlier perception and recognition and awareness of the emergency stopping situations.

However, since the warning will occur in the same unitary centrally mounted, eye level housing unit as the brake 36, this will focus the attention of the driver of the trailing vehicle to provide greater attention to this safety requirement situation, thereby improving the reaction time so that the driver will be able to bring his vehicle to a stop in earlier time frame and shorter stopping distance.

Figure 7:
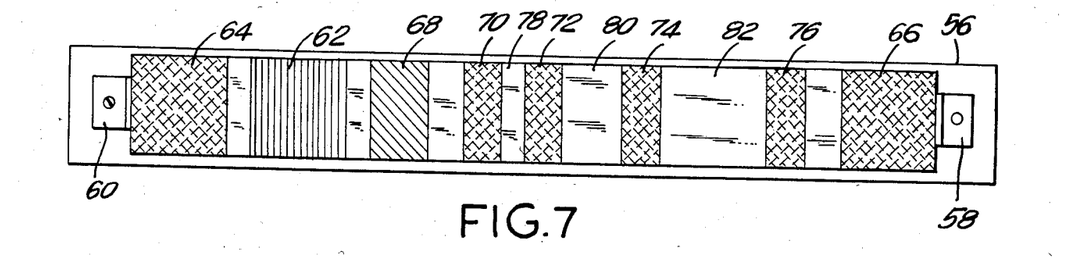
FIG. 7 is a view of a front face of the collision avoidance device of the present invention in accordance with another embodiment.

As shown in FIG. 7, the safe distance signal light need not be in the cross as shown in FIGS. 4-6. Alternately, the series of illuminated areas can be provided by vertical bars. More particularly, as shown in FIG. 7, there is provided a facing 56 on the housing unit which can be mounted to the housing unit by means of the fastening members 58, 60. On the face there is provided the standard brake light 62 which will be of a red color. On either end there is provided the amber or orange lights 64, 66. These can be the left and right directional signals.

In addition, there is shown to be included a green light 68. This can provide a still further feature so that each time the driver of the forward vehicle presses down the accelerator, the green light goes on. This provides clearer and earlier indication of the degree of safe space of the forward vehicle based on the action of the driver of the lead vehicle as communicated to the driver of the following vehicle.

The safe distance signal light is provided in this case by means of a plurality of vertical bars. Specifically, there are provided the vertical illuminated areas 70, 72, 74 and 76. The first two illuminated areas 70 and 72 are separated by a first opaque space 78. The illuminated areas 72 and 74 are separated by a second opaque space 80 which is of greater width than the space 78. The last two illuminated areas 74 and 76 are separated by an opaque space 82 which is of greater width than either the opaque areas 78 or 80. When the driver of the trailing vehicle sees all four illuminated areas 70, 72, 74 and 76, he knows that he is too close. When the opaque space 78 disappears and only three lights are seen there is a safer condition. As the driver of the trailing vehicle drops further behind, the opaque space 80 will be eliminated and only two areas of illumination will be seen. Finally, the opaque area 82 will be eliminated and only one light will be seen. This provides the safest following space condition.

In each of the aforementioned embodiments, it should be recognized that the opaque spacing between the various warning devices must be sufficient so as to avoid diffusion of one illuminated area on the other. Specifically, referring back to FIG. 4, the opaque spacing 84 between the brake light 36 and the safe distance signal light 38 should be wide enough to avoid any merging or diffusion of the light between these two devices. Similarly, in the other embodiments, adequate spacing must similarly be provided.

Figure 9:
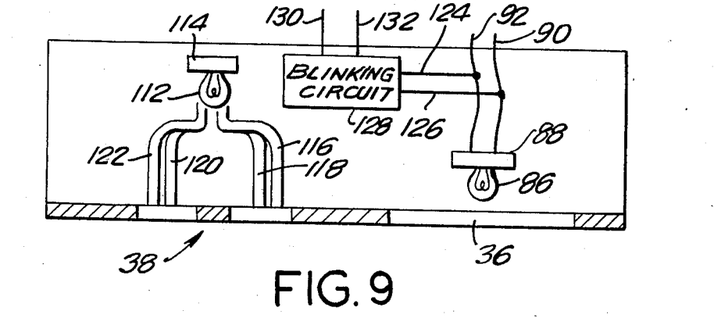
FIG. 9 is a schematic view similar to that shown in FIG. 8 and showing another embodiment of such circuitry.

Within the housing appropriate illumination means would be provided for illuminating the various illuminated areas. As shown in FIG. 9, behind the brake area 36 there is included a brake light 86 placed in a socket 88 from which extend the wires 90, 92 connected in standard fashion to the braking device on the car. As the brake goes on, the light 86 will be illuminated.

To illuminate the safe distance signal light 38 there is provided an additional illumination device 94 included within a socket 96. A parabolic reflector 98 is included so as to focus the light from the illumination device 94 to all of the four illuminated areas. Of course, more than one illumination device can be utilized for the four illuminated areas. Alternately, a single illumination device can be utilized.

Figure 8:
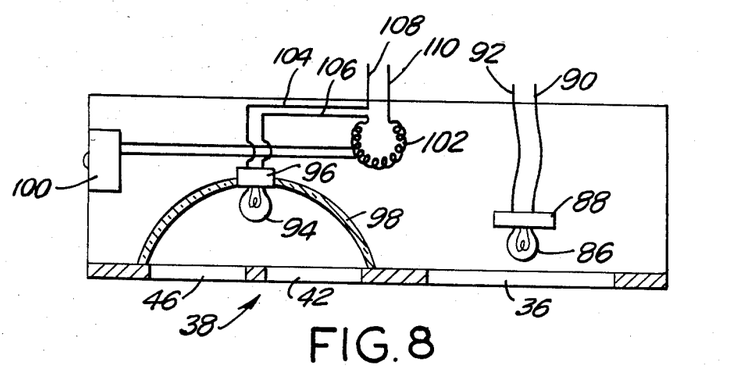
FIG. 8 is a schematic view showing the internal circuitry involved within the collision avoidance device of the present invention.

As shown in FIG. 8, a photoelectric device 100 can be included to sense the ambient light. This can control a rheostat 102 connected in series between the lines 104, 106 energizing the bulb 94. The lines from the rheostat 108, 110 would be sent to the vehicle to be energized by the vehicle battery.

By means of the ambient light sensor 100, appropriate illumination can be made depending upon the ambient light. During the day time, one illumination level can be utilized, while at night time a different level of illumination can be utilized. Alternately, a continuous range of illumination can be provided depending upon the amount of ambient light required for the best level of average driver visual requirements.

FIG. 9 shows yet another embodiment in providing illumination of the safe distance signal light 38. In this case, again a single illuminator 112 is provided in a socket 114. A series of light pipes 116, 118, 120, 122 can be provided to direct the light from the illuminating source 118 to the four illuminated areas constituting the safe distance signal light 38. Again, more than one illuminating device can be utilized and the light pipes can be appropriately placed to direct this light to each of the illuminated areas.

In the present embodiment of FIG. 9, the lines 124, 126 from the socket 88 are sent to a blinking circuit 128 which is energized from the lines 130, 132. These lines 130, 132 can be connected not only to the battery for proper illumination but also to the brake of the vehicle. As a result, when there is an emergency stop with hard pressure on the brake, or excessive deceleration of the car, the blinking circuit 128 can be energized so as to cause the brake light to blink indicating an emergency stop. Alternately, the blinking circuit can be connected to the safe distance signal light to have it blink.

It should be appreciated, that other types of circuitry can be included in the housing. For example, electronic circuitry can be included including integrated circuits for proper energization of the brake light and the safe distance signal light. It should further be appreciated that the safe distance signal light can take other forms of designs including other types of illuminated areas, separated by opaque spacing of different widths or heights and different degrees of illumination taking into consideration average driver age, visual capabilities, etc.

As has been heretofore explained the safe distance signal light of the present invention is one that stresses the size of the opaque areas between the illuminated areas. The driver accordingly focuses on the opaque space. The opaque space increase in sequence. Each opaque space is assigned a particular speed or time based on a visual mean average standard, that opaque space is seen the driver knows that he is too close for that speed or time. Similarly for larger spaces the driver focuses in on that space.

Previously there was described a configuration of the safe distance signal light as being of a cross configuration with the various arms or legs of the cross having different widths. FIGS. 10-13 show yet other embodiments of opaque areas having different widths which can be utilized for the safe distance signal light.

Figure 10:
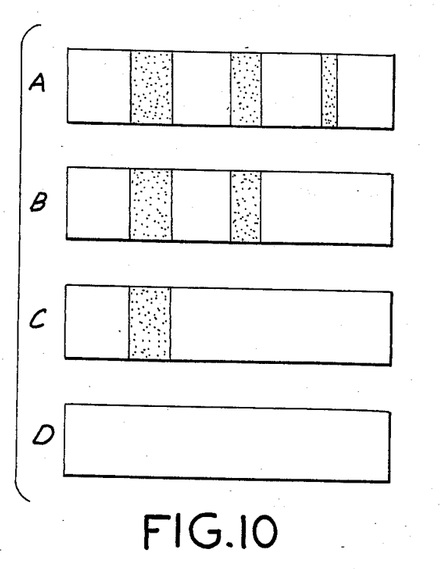

In FIG. 10, there is shown the use of another embodiment of a safe signal light. In line A three opaque widths are shown separating the four illuminated areas. The right most opaque width being the narrowest, the center opaque space being a wider width and the left most opaque space being the widest. If the driver sees all of these three opaque spaces, and accordingly all four illuminated areas, he realizes he is in a high hazard situation. When he sees only two opaque spaces and on those illuminated areas as in line B, he can know that he will have approximately two seconds at about 10-20 miles per hour. When he sees the one opaque space, as in line C he knows he has approximately three seconds at a speed of 20-40 miles per hour. When he sees no opaque spaces, and only one illuminated area, as in line D, he has approximately four seconds of stopping time for a speed of between 40-55/60 miles per hour.

Figure 11:
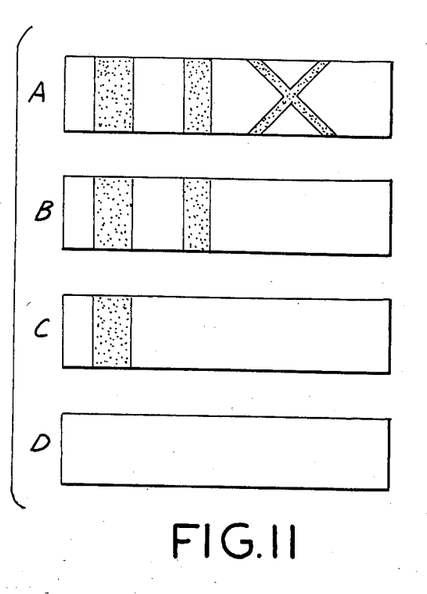

FIG. 11 shows another configuration wherein the narrowest opaque space forms "X" configuration having narrowest bars. The middle bar is again of larger width and at the left is the largest width opaque space.

Line A shows the configuration with all three opaque spaces visible. Lines B, C, and D show sequentially the operator's view with two opaque spaces, one opaque space and none of the opaque spaces visible.

Figure 12:
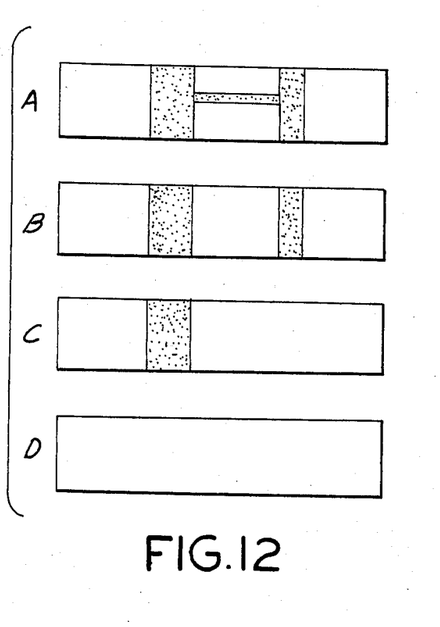

FIG. 12 shows yet a further configuration. In this case, the narrowest opaque space is the center bar of an "H" configuration. The right vertical space is of the next largest width and the left most vertical space is of the largest width. Again lines A, B, C and D show sequentially the operator's view with two opaque spaces, one opaque space, and non of the opaque spaces visible.

Figure 13:
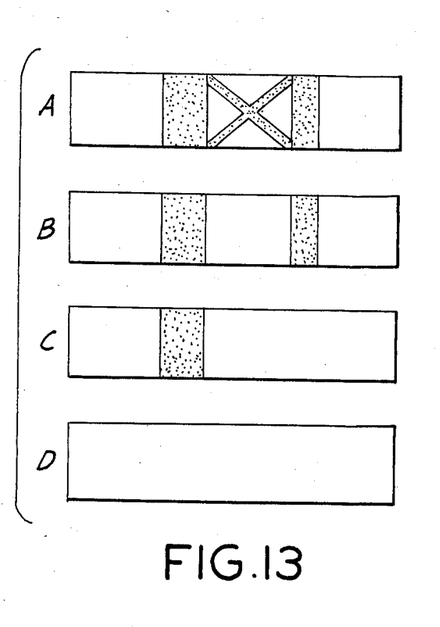

FIG. 13 shows yet a further configuration wherein the narrowest spaces are in the form of an "X" configuration which is in the center of two vertical spaces. The right most space is of the next larger opaque width and the left most vertical space is of the largest opaque width. Again, lines A, B, C and D show the operator's view with two, one and none of the opaque spaces visible.

It should also be appreciated, that the position of the various spaces could be reversed. For example, the narrowest block or line opaque area could be at the left most portion and the widest opaque at the right most position. by way of example, in FIG. 11 the "X" could be at the left side with the wide space at the right side. Similarly, in the other figures portion could be at the right and the wider portion could be at the right and the wider portion could be at the left.

There has been disclosed heretofore the best embodiments of the invention presently contemplated. However, it is to be understood that various changes, modification and improvement may be made hereto without departing from the spirit of the invention.

I claim:

1. A collision avoidance device for providing an integrated visual indication of safety conditions between a leading and a trailing vehicle, comprising: a unitary housing for central mounting on the rear of a leading vehicle at approximateley center eye level for viewing by the driver of the trailing vehicle; a brake light mounted in said unitary housing, and a safe distance signal light mounted in said unitary housing and spaced sufficiently from said brake light to avoid diffusion therebetween, said safe distance signal light comprising a plurality of discrete circumscribed opaque spaces being of respective uniform width, only one opaque space being assigned to each corresponding distance between the vehicles, the widths of the plurality of opaque spaces increasingly sequentially with respect to such distances, each opaque space separating at least two adjacent discrete circumscribed unpaired illuminated areas of any desired size unrelated to the distance between the vehicles, whereby the opaque spaces will progressively appear to the viewer of the driver of the trailing vehicle upon the closure of the distance between the vehicles.

2. A collision avoidance device as in claim 1, wherein all said illuminated areas are of substantially identical size and shape.

3. A collision avoidance device as in claim 1, wherein said safe distance signal light comprises four illuminated areas located in four quadrants of a rectangular grid system and wherein said opaque spaces are along a horizontal and vertical axes separating said four quadrants.

4. A collision avoidance device as in claim 3, wherein the opaque space along the vertical axis is of a first relatively wide width, the opaque space along the horizontal axis on one side of the vertical axis is of a second width less than said first width and the opaque space along said horizontal axis on the other side of the vertical axis is of a third width less than said second width, whereby with increasing separation distance between the vehicles, said third width will disappear reducing the illuminated areas seen from four areas to three areas, then said second width will disappear reducing the illuminated areas seen to two areas, and finally said first width will disappear reducing the illuminated areas seen to one area.

5. A collision avoidance device as in claim 4, wherein said third width is on the left side of said vertical axis and said second width is on the right side of said vertical axis.

6. A collision avoidance device as in claim 2, wherein said illuminated area and said brake lights are of uniform height and are laterally positioned with respect to each other.

7. A collision avoidance device as in claim 2, wherein said illuminated area and said brake lights are positioned one above the other.

8. A collision avoidance device as in claim 1, and further comprising an acceleration light in said housing for indicating continued acceleration of the leading vehicle.

9. A collision avoidance device as in claim 1, and further comprising a warning light in said housing for indicating a change in the situation of the leading vehicle as viewed by the driver of the following vehicle.

10. A collision avoidance device as in claim 1, and comprising a blinking circuit for blinking of at least one of said brake light and said safe distance signal light upon application of emergency braking.

11. A collision avoidance device as in claim 1, and comprising light means contained in said housing for continuous illuminating of said illumination areas of said safe distance signal light, and detection means on said housing for detecting ambient light and controlling the amount of illumination from said light means corresponding to the amount of ambient light.

12. A collision avoidance device as in claim 11, wherein said light means comprises a day illumination means and a night illumination means, said detection means selecting one of said day and night illumination means in response to the ambient light and external conditions.

13. A collision avoidance device as in claim 1, and further comprising directional signals positioned on said housing.

14. A collision avoidance device as in claim 1, and comprising a source of illumination in said housing, and parabolic reflector means for directing the illumination from said source of illumination to said illuminated areas.

15. A collision avoidance device as in claim 1, and comprising a source of illumination in said housing, and a plurality of light pipe means for directing the illumination from said source of illumination to said illuminated areas.

16. A collision avoidance device as in claim 1, wherein said housing comprises a lip around its periphery to prevent glare.

17. A collision avoidance device as in claim 16 and further comprising shades to prevent glare.

18. A collision avoidance device as in claim 16, wherein said housing comprises mounting means for mounting said housing onto the top of the trunk of the leading vehicle and a projecting shield for preventing glare.

19. A collision avoidance device as in claim 1, wherein said housing comprises mounting means for mounting said housing inside the leading vehicle for display through the rear window.

20. A collision avoidance device for providing a visual indication to the driver of a trailing vehicle when the distance between his vehicle and a leading vehicle is safe, caution required, or hazardous, said device comprising a plurality of discrete circumscribed opaque spaces being of respective uniform width, only one opaque space being assigned to each corresponding distance between the vehicle, the widths of the opaque spaces increasing sequentially with respect to such distances, each opaque space separating at least two adjacent discrete circumscribed unpaired illuminated areas of any desired size unrelated to the distance between vehicles, whereby appearance of all the opaque spaces indicates a hazardous condition of distance between the vehicles, and the sequential disappearance of the opaque spaces as the adjacent illuminated areas merge indicates safer conditions of distances between the vehicles.

21. A collision avoidance device as in claim 20, wherein said opaque spaces form an orthogonal cross configuration, the vertical opaque space being of widest width, the horizontal opaque space on one side thereof being a smaller width, and the horizontal opaque space on the other side thereof being of the smaller width.

22. A collision avoidance device as in claim 21, wherein said smallest width opaque space is on the left side of said vertical opaque space and the next larger opaque space is on the right side of said vertical opaque space.

23. A collision avoidance device as in claim 22, and comprising constant illumination means for maintaining the illumination of said device whenever the vehicle is operating, and detection means for varying the intensity of said illumination means in accordance with the amount of ambient light.

24. A collision avoidance device as in claim 20, wherein said opaque spaces define symbols.

* * * * *